United States Patent [19]

Wang et al.

[11] Patent Number: 5,848,426

[45] Date of Patent: *Dec. 8, 1998

[54] AUTOMATIC DATA TRANSLATION BETWEEN DIFFERENT BUSINESS SYSTEMS

[75] Inventors: Ynjiun P. Wang; John B. Chu, both of Fort Myers, Fla.

[73] Assignee: Metanetics Corporation, Fort Myers, Fla.

[*] Notice: The term of this patent shall not extend beyond the expiration date of Pat. No. 5,490,217.

[21] Appl. No.: 596,946

[22] Filed: Feb. 5, 1996

Related U.S. Application Data

[63] Continuation-in-part of Ser. No. 185,701, Mar. 5, 1993, Pat. No. 5,490,217.

[51] Int. Cl.$^6$ ......................................... G06F 3/06
[52] U.S. Cl. ............................................ 707/505; 358/448
[58] Field of Search ..................................... 395/766, 767, 395/769; 358/448, 462; 235/385, 462; 380/51; 707/505, 506, 508

[56] References Cited

U.S. PATENT DOCUMENTS

| | | | |
|---|---|---|---|
| 5,337,361 | 8/1994 | Wang et al. | 380/51 |
| 5,340,966 | 8/1994 | Morimoto | 235/376 |
| 5,363,214 | 11/1994 | Johnson | 358/462 |
| 5,383,112 | 1/1995 | Clark | 395/208 |
| 5,490,217 | 2/1996 | Wang et al. | 380/51 |
| 5,506,697 | 4/1996 | Li et al. | 358/448 |
| 5,510,604 | 4/1996 | England | 235/462 |
| 5,521,815 | 5/1996 | Rose, Jr. | 395/228 |
| 5,635,012 | 6/1997 | Belluci et al. | 156/277 |
| 5,646,389 | 7/1997 | Bravman et al. | 235/385 |

*Primary Examiner*—Stephen S. Hong
*Attorney, Agent, or Firm*—Benesch, Friedlaner, Coplan & Aronoff LLP

[57] ABSTRACT

To avoid cost and errors associated with manual data re-entry, methods are provided for transferring data between different business systems (e.g., computer programs). After data for a purchase order is entered using a first purchase order generating program, a data file is prepared including the input data correlated with field identifiers identifying the individual information category of particular data elements. Field identifiers may typically be a sequence of numbers or merely a pre-selected sequence of the data fields. The data file is encoded into a 2-D image code which can be printed out with the purchase order. On decoding of the 2-D image code by a recipient, the data file is recovered. The field identifiers then enable identification of particular categories of information for mapping into the second business system, such as an order acceptance/invoice generating program. Use of the data file with field identifiers permits each party to a business transaction to select its own preferred application program, while enabling data from the first program to be automatically entered into appropriate information entry categories of the second different program, without requiring manual re-entry of the original data. A field definition file, correlating field identifiers of a data file to information categories, may also be encoded into a 2-D image code when the image code is encoded.

24 Claims, 14 Drawing Sheets

FIG. 10

DATA FILE
(TABLE REPRESENTATION)

| FIELD IDENTIFIER | DATA ELEMENT |
|---|---|
| 0 | DF - ABC_CORP - PO |
| 1 | ABC CORPORATION |
| 2 | WESTERN DIVISION |
| 7 | PRODUCT A |
| 8 | 200 UNITS |
| 9 | JANUARY 30, 1996 |
| 10 | PRODUCT B |
| 11 | 150 UNITS |
| 12 | FEBRUARY 15, 1996 |

*Fig. 16*

FIELD DEFINITION FILE
(TABLE REPRESENTATION)

| FIELD IDENTIFIER | INFORMATION CATEGORY |
|---|---|
| 0 | IDENTIFICATION OF BUSINESS SYSTEM GENERATING DATA FILE |
| 1 | COMPANY NAME |
| 2 | COMPANY DIVISION |
| 3 | STREET ADDRESS |
| 4 | CITY |
| 5 | STATE |
| 6 | ZIP CODE |
| 7 | DESIRED PRODUCT NAME |
| 8 | DESIRED QUANTITY |
| 9 | DESIRED DELIVERY DATE |
| 10 | DESIRED PRODUCT NAME |
| 11 | DESIRED QUANTITY |
| 12 | DESIRED DELIVERY DATE |

Fig. 17

RELATIONSHIP FILE
(TABLE REPRESENTATION)

| MAPS FROM | DF - ABC_CORP - PO | |
|---|---|---|
| MAPS TO | ORDER ENTRY | |
| MAP FROM DATA FILE FIELD NO. | MAP TO RECEIVING SYSTEM FIELD NO. | DEFAULT DATA TO MAP IF NONE PRESENT |
| 1 | 4 | - |
| 2 | 5 | WESTERN DIVISION |
| 3 | 6 | 10 S. FIRST ST. |
| 4 | 7 | ABC TOWN |
| 5 | 8 | OH |
| 6 | 9 | 44333 |
| 7 | 15 | 0 |
| 8 | 16 | - |
| 9 | 17 | - |
| 10 | 18 | - |
| 11 | 19 | - |
| 12 | 20 | - |

Fig. 18

AUTOMATIC DATA TRANSLATION BETWEEN DIFFERENT BUSINESS SYSTEMS

This is a continuation-in-part of application Ser. No. 08/185,701, filed Mar. 5, 1993, now U.S. Pat. No. 5,490,217, issued Feb. 6, 1996.

This invention relates to the transfer of business transaction data between different business systems and, more particularly, to such transfer by entry of data via a first business system (such as a purchase order generating program) and encoding of the data into a 2-D image code, followed by decoding of the 2-D image code to enable automatic translation of data entries for use by a second business system (such as an invoice generating program).

BACKGROUND OF THE INVENTION

The parent application identified above provided new types of document handling systems which utilize selective encoding into a two-dimensional machine readable image code (2-D image code) of both:

actual information content of a document which may include an actual facsimile image of text, images, signatures or hand-written notes, and reference information related to the information content for uses including (A) identification of the information content, (B) use of the information content for authentication of signatures or documents, and (C) control of processing of the information content. By subsequently decoding the 2-D image code the information content and reference information can be recovered and applied for such uses.

An example of a (C) type use is automated entry of data upon receipt of an order form or tax form. At the time of form preparation the customer or taxpayer enters information into a computer-displayed form. The form type and line or blank number into which data is entered, plus the actual data, are all encoded by the computer into a 2-D image code. The actual data is thus encoded as information content so that the 2-D image code incorporates the data for subsequent decoding. For forwarding, the order form or tax form is printed out in human-readable format on a sheet of paper also bearing the 2-D image code (or such form and image code can be directly transmitted by fax). Upon receipt by the merchant or tax authority, the 2-D image code is decoded, enabling each item of data entered in the form to be identified as to where it was entered and what type of data it is (dollar amount, date, name, etc.). The receiving computer system is thus enabled to automatically receive and process all relevant information content, by use of the accompanying reference information, both of which were encoded in the image code.

An important aspect of business transactions involves the transfer of information between different business systems. Parties doing business together often find it necessary to exchange information. Commonly, the data must be properly recorded and stored for processing applications by each party. It is also common that each party will desire to use the transferred data in a different business system. For example, the first party may record purchase order information in its computer system for generating purchase orders. The second party, upon receipt of the purchase order and shipment of the ordered goods, will require entry of the same data for use in its computer system for generating invoices. Typically, this has required the first party to manually enter the relevant data for use in the purchase order program and the second party to manually enter the same data from the purchase order form into its invoice program. As will be apparent, when significant amounts of data are involved undesirable amounts of time and expense will be required for repetitive manual entry of the same data. More importantly, each time data must be manually entered there is an exposure to human error. If each party used the same or commonly prepared computer systems such commonality could be used to facilitate data transfer between programs. However, on a broader basis it is desirable to enable data transfer between business computer systems, so that each party may continue to use the business computer system best suited for its operations, independently of the particular business computer systems used by other parties.

The parent application describes automatic document handling systems, including systems which meet such objectives. In the parent application, in one embodiment a first business system is arranged to encode a translation table into a 2-D image code. As particularly described, the translation table includes data elements to be sent to the receiving party organized into data fields, together with a label for each data field identifying the information represented by the data in that data field. The receiving business system reads the 2-D image code and, by use of the field labels, is able to identify the information represented by the data in each field to enable processing of such data by the receiving system. Since, in the described embodiment, both data and data field labels are included in the translation table and encoded into the 2-D image code will be relatively large.

Objects of the present invention are, therefore, to provide new and improved methods of transferring data entered by use of a first business system, to enable use of such data with a second business system, without the need for manual re-entry of the data. It is also an object to reduce the total quantity of information that must be transferred from the first business system to the second. Additional objects are to provide data transfer methods having one or more of the following advantages or capabilities:

data transfer between different business systems without manual re-entry of data;

provision of a data file with data in a plurality of data fields to enable automatic data entry;

encoding of a data file into a 2-D image code for subsequent decoding and automatic data entry;

provision of a field definition file identifying information represented by information categories in each data field, for use by both originating and receiving business systems;

encoding of a field definition file into a 2-D image code for use by a receiving business system; and provision of a relationship file to enable a receiving business system to map data present in data fields to appropriate file locations within a receiving business system.

SUMMARY OF THE INVENTION

The invention as described in above-referenced application Ser. No. 185,701 with reference to FIGS. 1 through 12 is summarily described as follows. The present invention is more particularly summarized below with reference to FIGS. 13 through 18.

In accordance with the invention, there is described an automatic document handling system which includes programmed general purpose computer means for processing and storing documents. Input and output devices are operatively interconnected with the computer means. The system of the invention is also comprised of a 2-D image code which encodes identifying, content and document, format information, processing instructions, and encryption keys (schemes for providing document security) concerning each document handled by the system. The invention further includes program means for generating said image code initially based on the above listed features of the document handled and further for subsequently modifying said image code based on the modification, alteration and/or expansion of said document.

In one embodiment of the invention a document in human readable form is scanned into said system and a 2-D machine readable image code is created containing identity and content information relative to that document. The machine readable image code can then be reproduced and/or printed by the system and used to retrieve said document from the system at a later time. In addition, if said document is altered, the altered version may be re-entered into the computer, the computer storage location of the original version of the document being identified by the information in said machine readable image code and then stored information may be updated based on the content of the altered version of the document. The machine readable image code itself is then modified to reflect the new information associated with the document in question.

Furthermore, a sufficient amount of information may be encoded in the machine readable image code such that with only the machine readable image code itself the entire document may be reproduced at another location without having to access the information stored on the system which produced the machine readable image code.

In a second embodiment of the invention, the system may be used to generate a document in human readable form which document has associated therewith (also generated by the present system) a 2-D image code containing the above described document identifying and content information, as well as the other above described attributes of the document.

In either of these embodiments, the document described may be transmitted or forwarded either physically by human delivery means or by any of the described communication means. Upon its arrival the document may be used as a paper document as is traditionally done.

As contemplated by the invention, the document may be scanned in (if in paper form) or received by (if transmitted electronically) a second, stand alone system of the type described herein. If the document is so handled, the 2-D image code will contain instructions as to how the document is to be handled by the system of the invention. This may include electronic storage of the document, modification of already stored versions of the document, the generating of additional paper documents, verifying the authenticity of the document and the like.

Yet another embodiment of the invention is a system which may be used to encode certain identifying information such as an actual signature, seal, finger prints, retina feature, facial picture, significant dates and the like into the machine readable image code. The encoded (and encrypted if desired) image may then be reproduced on a document such as a check, passport, etc. When the bearer of such document attempts to use same, the information contained in the machine readable image code may be scanned, decoded (and decrypted) at the user's site and compared to the human readable information contained on the image-containing document, or the bearer's fingerprints, retina feature, facial feature, signature, etc., in real time.

In accordance with the invention as described with reference to FIGS. 13 through 15, a method of transferring for use with a second business system, data elements entered by use of a first business system, includes the steps of:

(a) storing data elements for a plurality of information categories of a business transaction, by use of the first business system;

(b) providing a data file including the data elements in a plurality of data fields, each identified by a field identifier;

(c) providing a field definition file correlating field identifiers to individual information categories of the plurality of information categories;

(d) encoding the data file into a 2-D image code;

(e) outputting a representation of the 2-D image code;

(f) decoding the 2-D image code to recover the data file; and (g) utilizing the field definition file to identify information categories of data elements included in data fields of the data file, to enable the data elements from the data file to be processed by use of the second business system.

In applications of the invention step (d) may desirably include also encoding into the 2-D image code the field definition file provided in step (c), to provide the contents of such file for use in identification of information categories in step (g). Alternatively, the field definition file may be communicated earlier or by other means for use in step (g). Implementation of step (g) may also include provision and use of a relationship file correlating particular data fields to specific data entry categories to enable the mapping of data elements from the data file for processing by use of the second business system.

For a better understanding of the invention, together with other and further objects, reference is made to the accompanying drawings and the scope of the invention will be pointed out in the accompanying claims.

BRIEF DESCRIPTION OF THE DRAWINGS

FIG. 10 is an illustrative view of still another embodiment of the invention.

FIG. 16 is a tabular representation of an example of a data file provided in accordance with the invention.

FIG. 17 is a tabular representation of an example of a field definition file provided in accordance with the invention.

FIG. 18 is a tabular representation of an example of a relationship file provided in accordance with the invention.

DETAILED DESCRIPTION OF THE INVENTION

Figure 1:
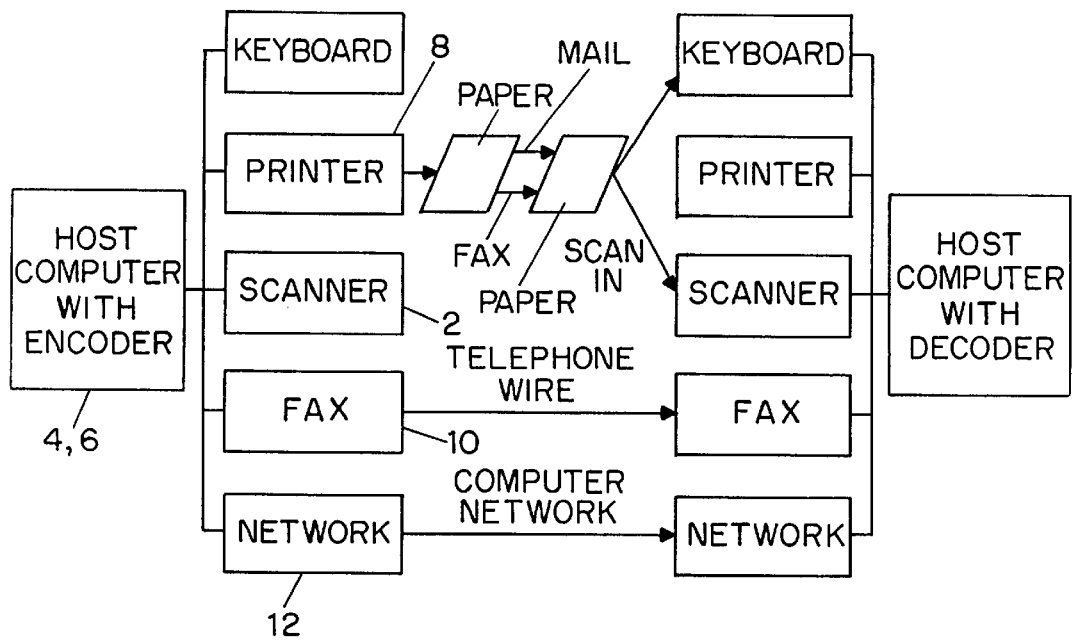
FIG. 1 is a block diagram of an automatic document handling system using the invention.
Figure 2:
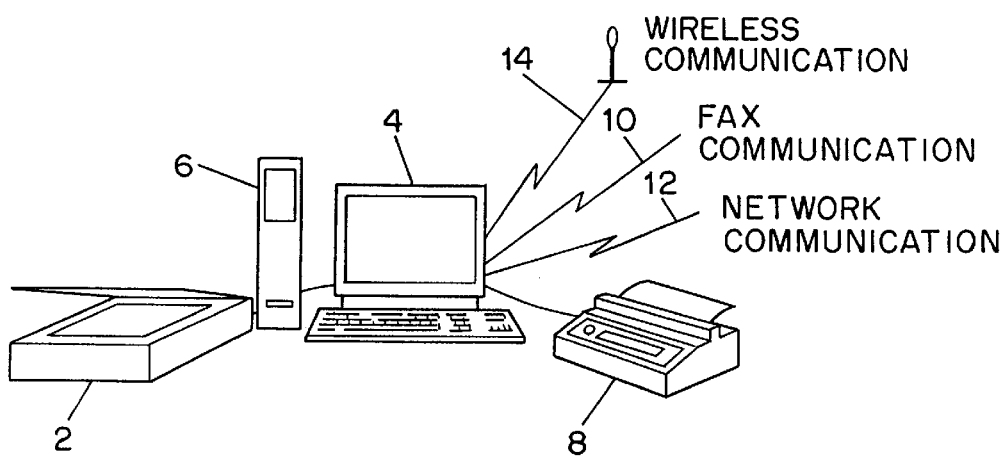
FIG. 2 is an illustrative perspective view of the system hardware used with the invention.

Referring now to FIGS. 1 and 2, there is illustrated a block diagram and perspective view of hardware used in association with the invention. The hardware is comprised of scanner 2, a machine readable image code encoder and decoder 4, a database server 6, a printer 8 and communication means such as a facsimile machine 10 network communication means 12, wireless communication means 14 and the like.

The encoder/decoder 4 will typically be a standard programmable micro-computer and includes a display, CPU, keyboard, diskdrive and memory which computer in turn controls the database server, scanner, printer and communication functions in a manner well known in the art. The computer scanner, printer and communication features are of a type and nature typically known in the industry and must be capable of reading, scanning, printing or transmitting machine readable image codes, hand-written and machine produced human readable characters and the like.

Figure 3:
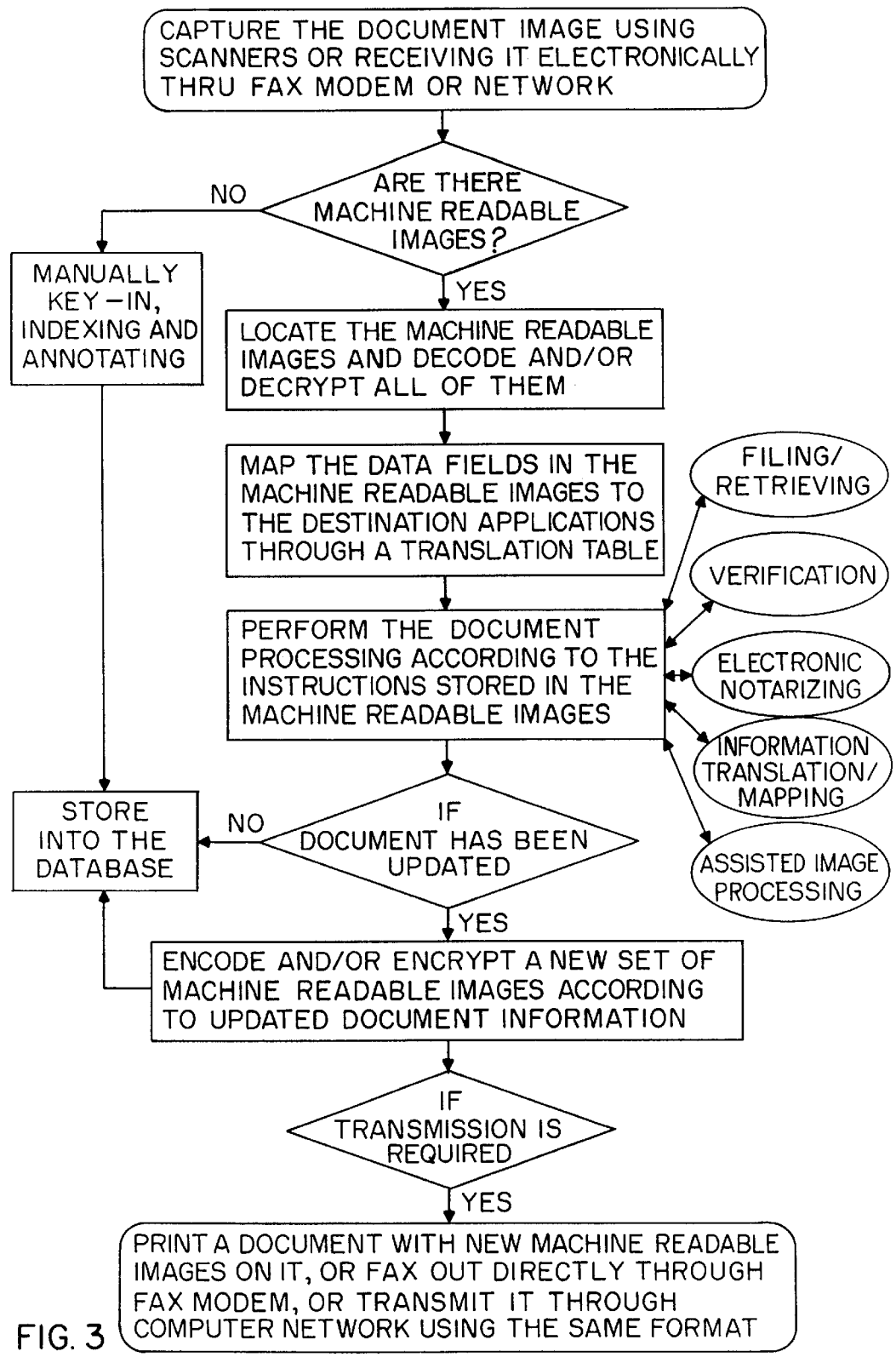
FIG. 3 is a computer flow chart outlining operation of the invention.
Figure 5:
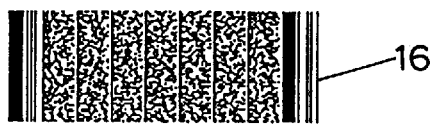
FIG. 5 is an illustrative view of the 2-D machine readable image code known in the art.

The invention further comprises a two-dimensional machine readable image code 16 (see FIG. 5), which is created, manipulated, printed, modified and/or included by the system of the invention through the use of program means provided as part of the present system. A functional flow diagram of the requirements of the program usable with the invention is shown in FIG. 3.

Figure 4:
FIG. 4 is an illustrative view of a one-dimensional machine readable image known in the art.

The two-dimensional machine readable image code 16 used in combination with the invention is of the type referred to in U.S. Pat. No. 5,113,445. This type of machine readable image code is contrasted with the more well known one-dimensional machine readable image code (UPC bar code) by comparing FIGS. 4 and 5. The machine readable image code 16 used in the present invention has the advantage of a higher information storage capability, as well as damage recovery/error correction capability.

Figure 6:
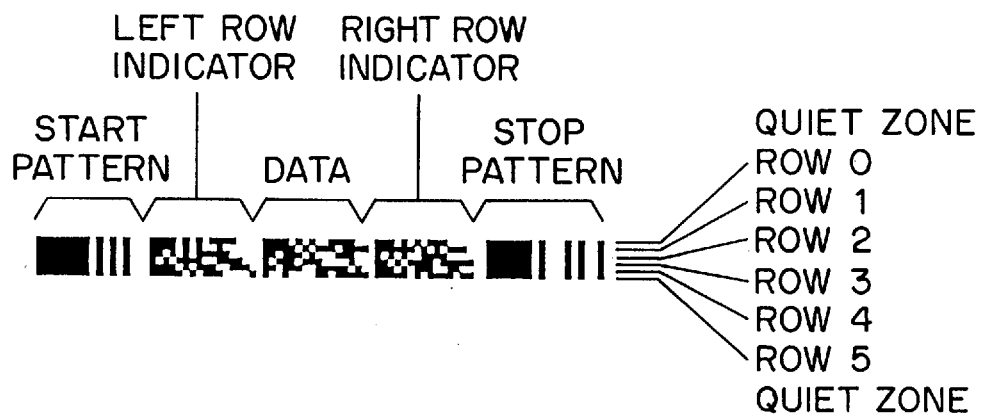
FIG. 6 is an exploded view of a portion of the image code of FIG. 5.

As shown in FIG. 6, which is an exploded view of a two-dimensional machine readable image code used advantageously in the invention, the machine readable image code is comprised of a pattern of vertical bars of pre-determined length that are spaced at various vertical and horizontal intervals. The information stored in a machine readable image code is a function of the size, frequency and location of the vertical bars. The process of encoding information in this manner is more completely described in the above referenced U.S. Pat. No. 5,113,445.

The operation of the system of the invention can be best described and illustrated in the processing of two categories of documents. The first category is documents generated without a machine readable image code. In order to file these types of documents, manually indexing/annotating such document's machine readable image code is required. After this indexing/annotating, the document can be filed/retrieved/printed by the invention system containing the index/annotation in machine readable image code form. The second category of documents generated by the system of the invention contain the machine readable image code affixed thereon. This kind of document can be filed automatically without human intervention, even if the document has been modified by human or machine.

The machine readable image code 16 document (the second category) can be scanned by a page scanner 2, a fax machine 10 or the like and processed by the decoder 4 and filed in the database server 6 for future reference. When retrieving the document, the encoder 4 will encode the index/annotation and other identification/content information such as format and processing instructions, encryption keys, etc., in the machine readable image code 16, and the encoder 4 can prepare and/or print the document combined with the machine readable image code 16. This special form can be sent over the fax machine 10, network 12, wireless network 14 or even by mail. The receiver can use a second system configured in accordance with the invention to automatically file the document, translate the data into the corresponding destination fields of the receiver's application, and/or process it by scanning same into the system and electronically storing the document in accordance with the information contained in the machine readable image code.

Furthermore, in the process of encoding and/or decoding of a document, the machine readable image code may be modified by this system to reflect the date, time, abstract of the information, pictorial and textural features extracted from the document, and the like which can be incorporated and serve as the authentication means. Therefore, the document while transferring/filing can be validated in real time.

Additionally, and as described above, the machine readable image code 16 of the invention may contain information about the entire content of a document in which case it would be necessary only to transfer or otherwise deliver the image code to another owner/user of a system of the invention. Upon receipt of the machine readable image code document, the receiver need only scan the image code and electronically store the information or otherwise reproduce the document in proper form from the information contained in the machine readable image code.

Finally, the information encoded in the machine readable image code 16 of the invention may be encrypted as well during the encoding process to provide for the security of information contained in the machine readable image code. Any encryption scheme known in the art, such as discussed in U.S. Pat. No. 5,016,274, may be used in accordance with the invention.

Following are specific examples of systems using the invention, which are provided to exemplify but not to limit the scope of the invention.

Medical Records

Figure 7:
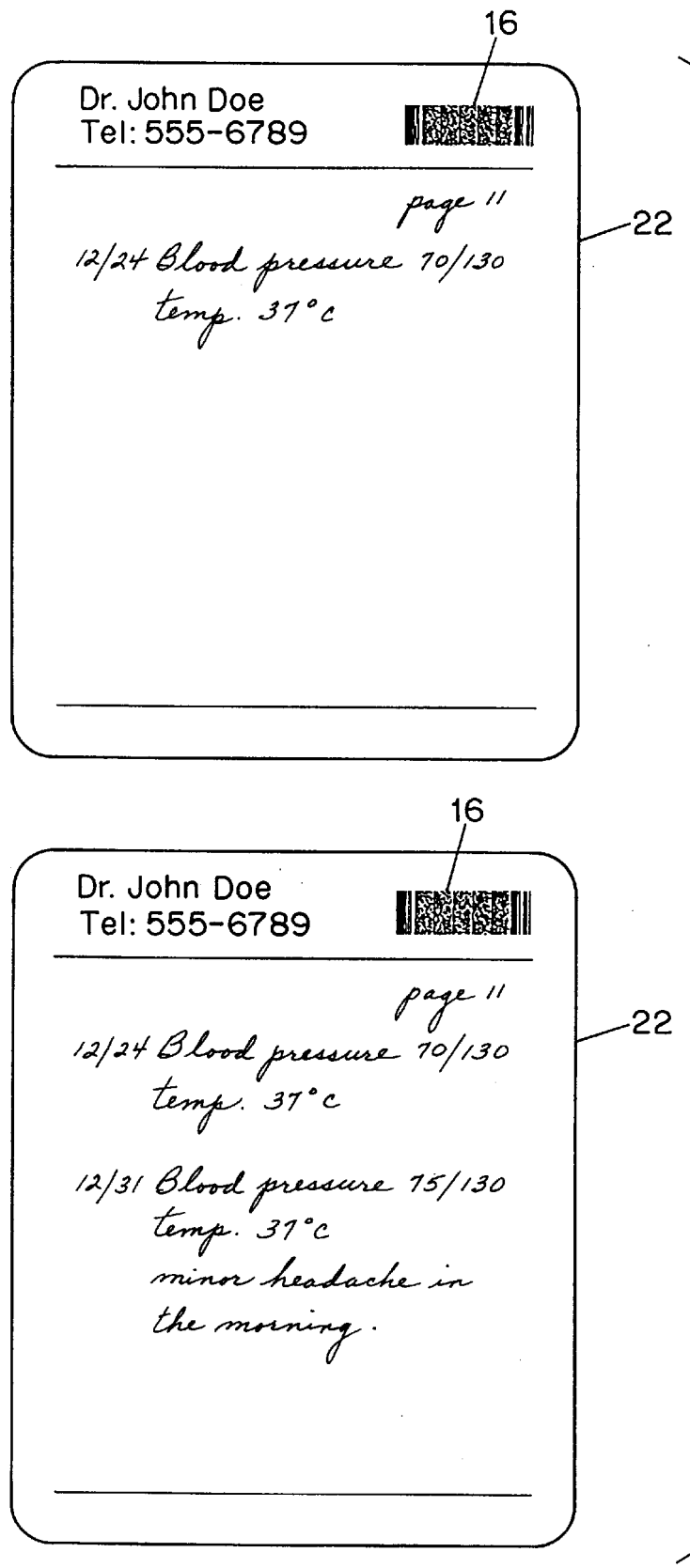
FIG. 7 is an illustrative view of one embodiment of the invention.

A patient medical progress chart 22 (FIG. 7) may be generated by the system of the invention containing a two-dimensional machine readable image code form 16, which machine readable image code will initially contain information about the form type, patient's historical information (name, address, social security number, billing rate, insurance information and the like), number of pages of the record and the like. After the machine readable image code containing form 22 is created the user thereof (i.e., a doctor) can record information, in typed form or even handwritten, thereon which subsequently may be rescanned by the system of the invention which system will update the computer file of the system and modify the machine readable image code 16 to reflect the addition of new information to that patient's file. When a patient visits a doctor's office or a hospital, a machine readable image code containing medical ID issued to the patient will be scanned, then the invention system will automatically retrieve the patient's file and display and/or print same.

Passports

Figure 8:
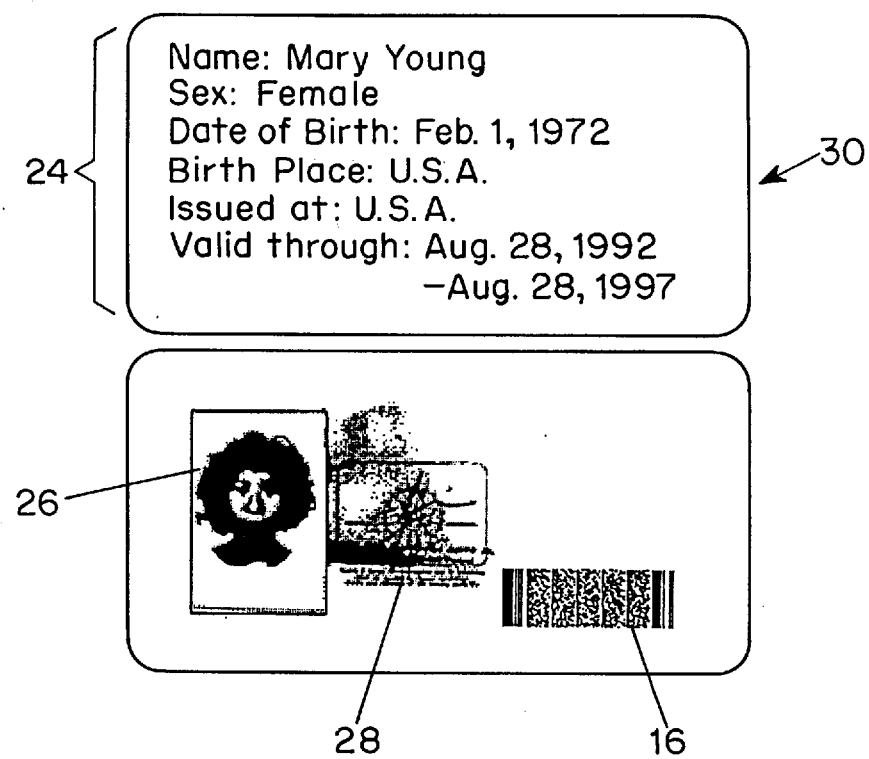
FIG. 8 is an illustrative view of another embodiment of the invention.
Figure 9:
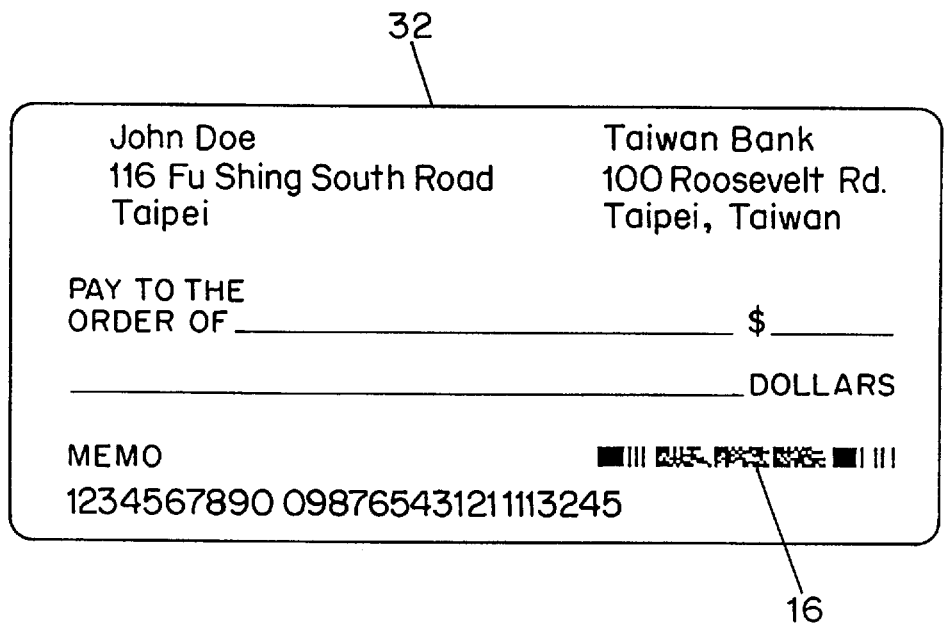
FIG. 9 is an illustrative view of yet another embodiment of the invention.

As shown in FIG. 8, the personal information 24, photograph image 26 and signature 28 on a passport 30 can be encoded into a machine readable image code 16 and said machine readable image code may be affixed to the passport 30 in a single pass process by printing the machine readable image code on it directly. The passport 30 can be verified as to its authenticity in real time without referring to the remote central database. The encodation process cannot be duplicated without the secret encryption key. However, it may be decoded by a much simpler scheme known in the art. The operator can compare the decoded result to see if it matches the human readable information on the document. Other bio-metric information, such as a fingerprint, retina pattern, facial picture, etc., can be encoded into machine readable image code incorporated into the document and can be used to verify the authenticity of the document holder. This method can also be used on driver's licenses, bank checks 32 (as shown in FIG. 9), and the like.

Tax Returns

Figure 10:
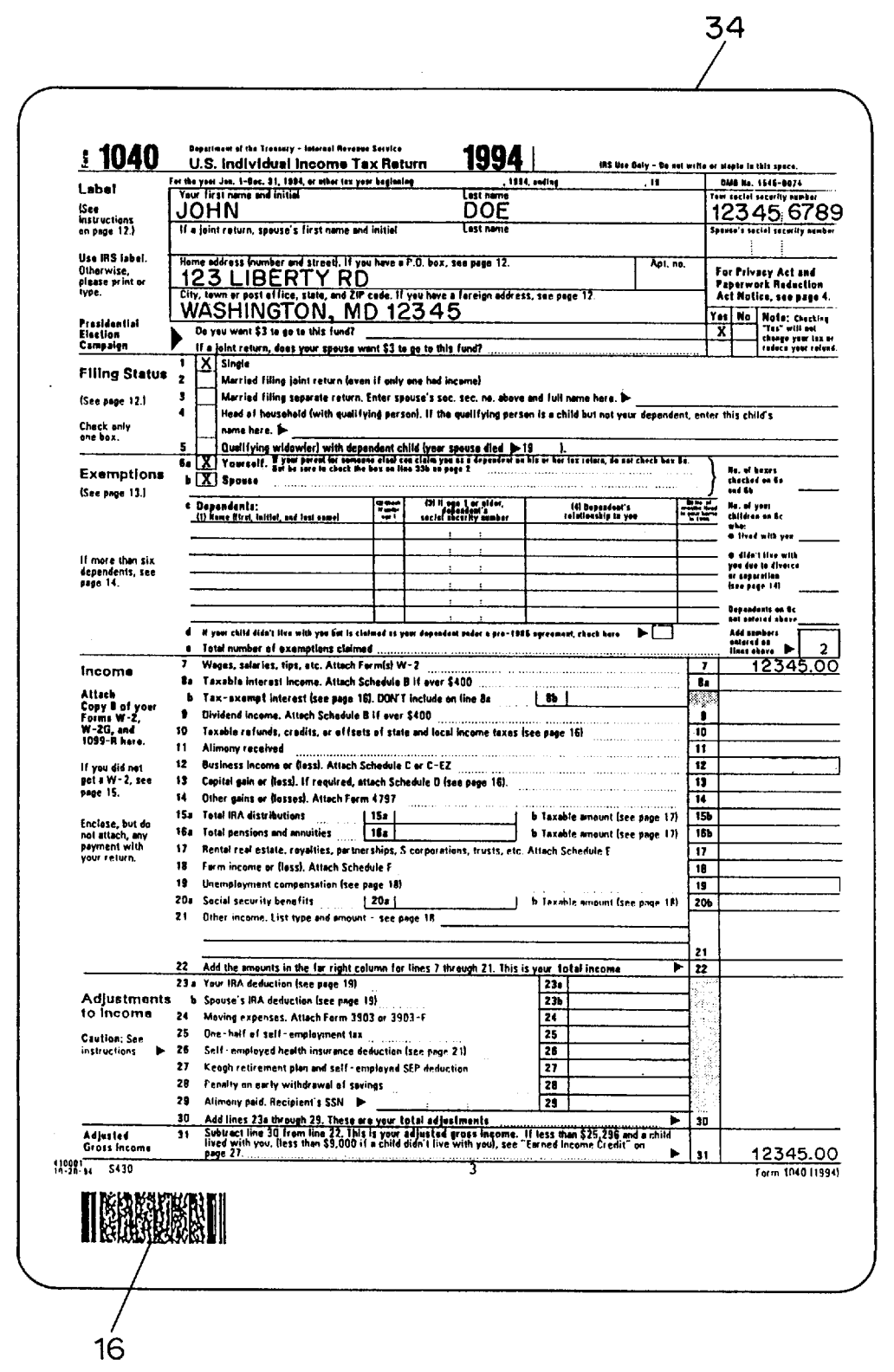

As shown in FIG. 10, the system of the invention also has application in the preparation of tax returns 34. As presently handled, a computer filed tax return 34 results in a document containing a column of pertinent numbers which are then entered manually by a human operator into a computer system.

However, a tax return 34 prepared by the present system, in addition to the standard form and information, would contain a two-dimensional machine readable image code 16 which contains all of the taxpayer information and the type of form filed as well as the numerical information reported by the taxpayer. The machine readable image code 16 may then be scanned directly into the taxing authorities computer system. This process eliminates the errors introduced by the manual entry system.

Figure 12:
FIG. 12 is an illustrative view of still another embodiment of the invention.

Similarly, as can be seen in FIG. 12, the same method can also be used on all kinds of business transaction forms such as purchase order, invoice, bill of lading, etc. With the aid of a translation table, different business systems can exchange information through different business transaction forms which are embedded with the same field definitions of the two dimensional machine readable image code.

A document, i.e., purchase order 36, with data fields of name, address, ship to, items, quantities, etc., can be encoded in a universal form containing unique fixed data fields called translation tables 38, such that the data fields in the document can be mapped to the unique fixed data fields in the translation table 38 according to their meanings. The two-dimensional machine readable image code 16 contains the information in the format of the translation table instead of the original purchase order format. Additionally, the machine readable image code may contain the format of the original document.

The advantage of using translation table 38 to encode the business transaction document is the ease of exchanging information from system to system in this form. For example, an invoice system receiving the above prepared purchase order 36, can scan in the two-dimensional machine readable image code on the purchase order and "understand" the data fields because they are defined in the translation table. Because the look of the purchase order form may differ from one company to the other company, the translation table 38 used for encoding the data fields can be defined and used by all different forms and companies.

Electronic Notary

Figure 11:
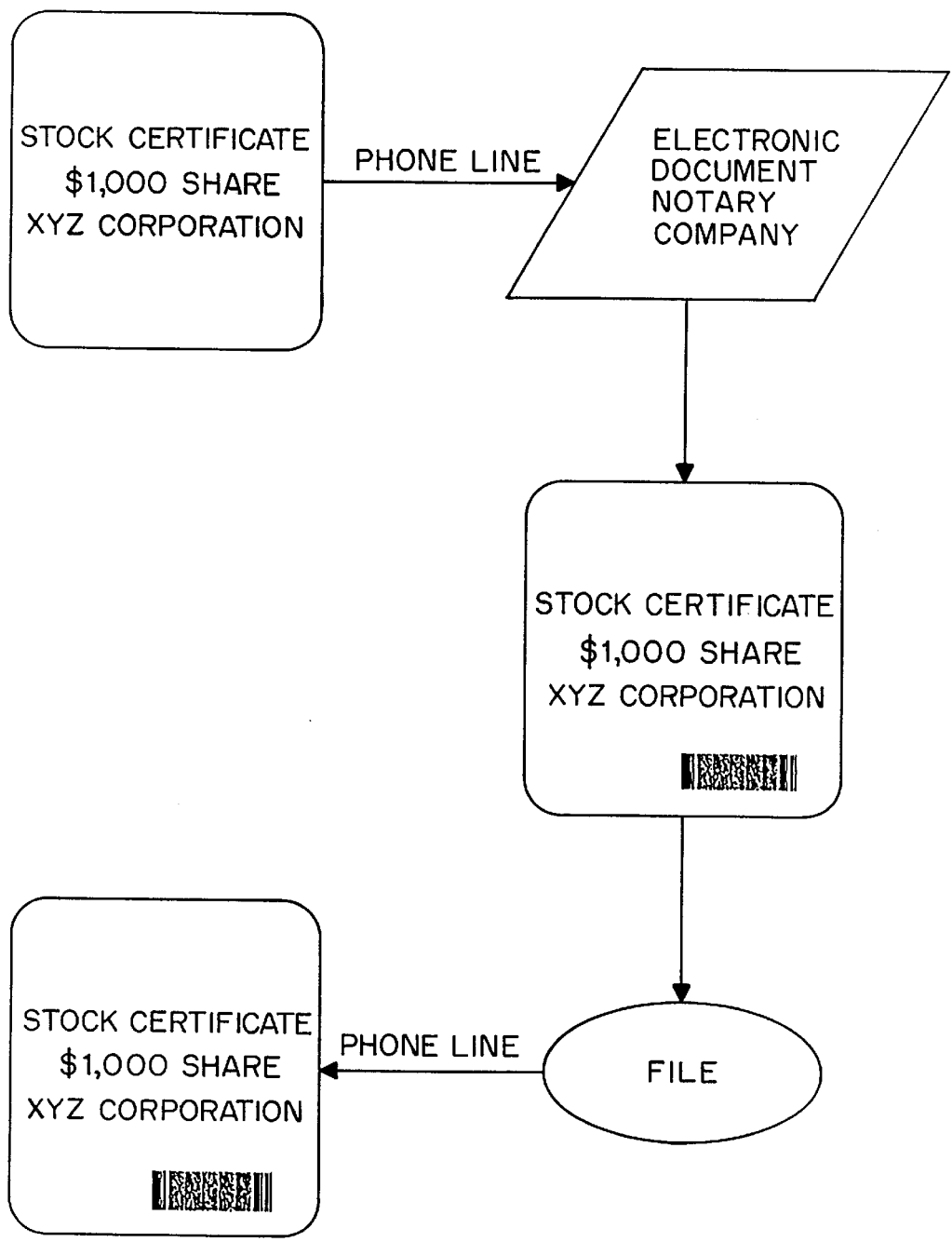
FIG. 11 is an illustrative view of still another embodiment of the invention.

As shown in FIG. 11, the system of the invention also has application in the electronic verification process. The operation can be described as follows: whenever there is a need for verifying a document, one can transmit the document image through fax or computer network to an independent third party institute or company. The company can process the document image by locking the document image and extracting the pictorial and texture features, then encrypting these features, time stamp, place, and the items needed to be verified into a machine readable image code. The verification information will be stored in the company's database for later reference. The original document with the resulting machine readable image code embedded will be transmitted through the same communication means back to the applicant.

When a need of verifying a document arises, the document can be transmitted back to the company. The system will automatically check whether the pictorial features and information on the document match the pictorial features and information stored in the embedded two-dimensional machine readable image code. If yes, then the system can double check the database record to confirm the verified transaction existed. If both verification processes succeed, the validity of the verified document, is confirmed. With a similar method and bio-metric and other like information, one can issue an airline ticket, theater ticket, securities (e.g., stock certificate), etc. over the phone line, through fax or computer network.

DATA TRANSFER METHODS OF FIGS. 13–18.

As noted above, it is commonly desirable to transfer data between companies or other entities for business transactions and other purposes. FIG. 13 illustrates, for a series of steps commonly involved in a relatively simple business transaction, that such a transaction actually contains weak spots subject to human error in the repeated re-entry of data.

Figure 13A:
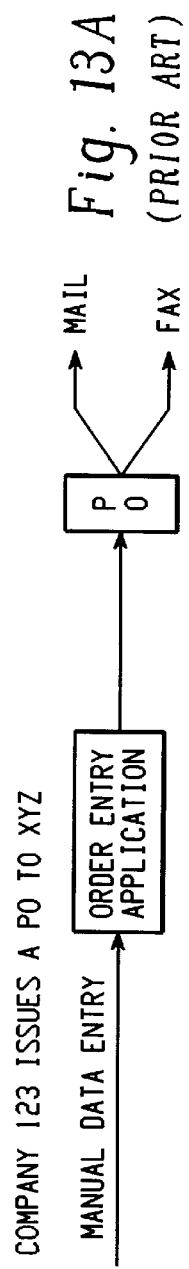
FIGS. 13A, B and C illustrate a sequence of a prior art business transaction requiring repeated manual re-entry of data.
Figure 13B:
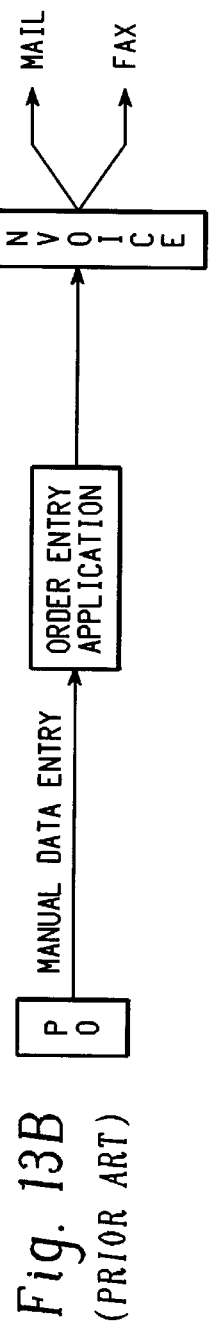
Figure 13C:
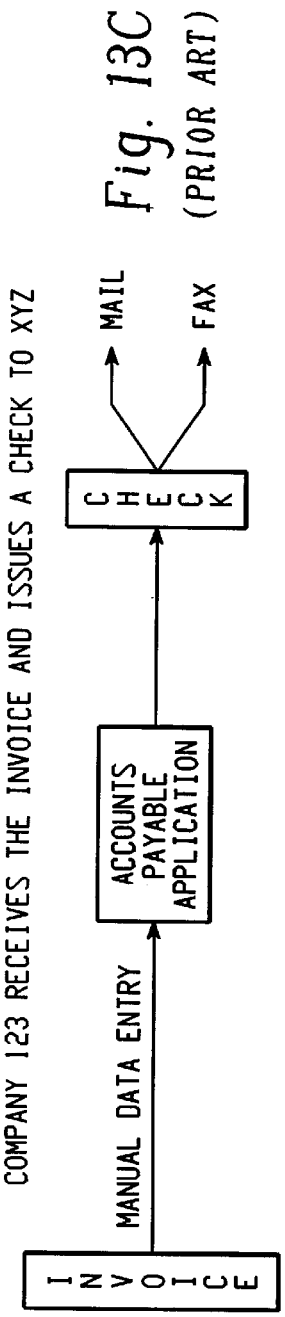

As represented in FIG. 13A, when company 123 is short of supplies, the purchasing department manually enters itemized information into the computer and generates a purchase order ("PO"). As represented in FIG. 13B, when company XYZ receives the PO the data processing department manually enters data into the computer to check for availability of the products. The PO is then given to the accounting department to generate an invoice to go with the shipment. As represented in FIG. 13C, when company 123 receives the products, the invoice data is manually entered into the computer to perform reconciliation. A check is issued to company XYZ which concludes the transaction. In this scenario, there are two weak spots: when company XYZ receives the PO and when company 123 receives the invoice. At both spots, the transaction is exposed to human error in data re-entry and the data re-entry is time consuming and costly.

Figure 14A:
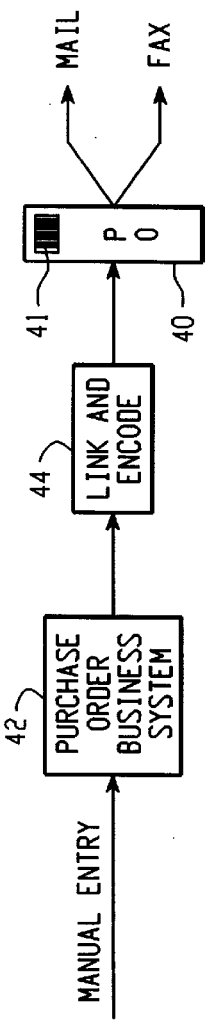
FIGS. 14A, B and C illustrate a business transaction sequence avoiding manual data re-entry, by use of the invention.

FIG. 14 illustrates the same business transaction with use of the present invention. As represented in FIG. 14A, the PO 40 generated by company 123 (by use of its purchase order generating business system 42) now includes a 2-D image code in the form of a 2-D bar code 41 at a designated location on the form. As will be described in greater detail, the bar code contains a data file including elements of the PO data with associated field identifiers usable to identify individual data fields at which PO data elements of particular information categories (e.g., company name, address, part number, quantity, etc.) are included in the data file. Thus, at 44 PO data elements are linked to appropriate (e.g., predetermined) data fields and the data file comprising such data fields is encoded into a 2-D image code, which is printed on the outgoing PO 40.

Figure 14B:
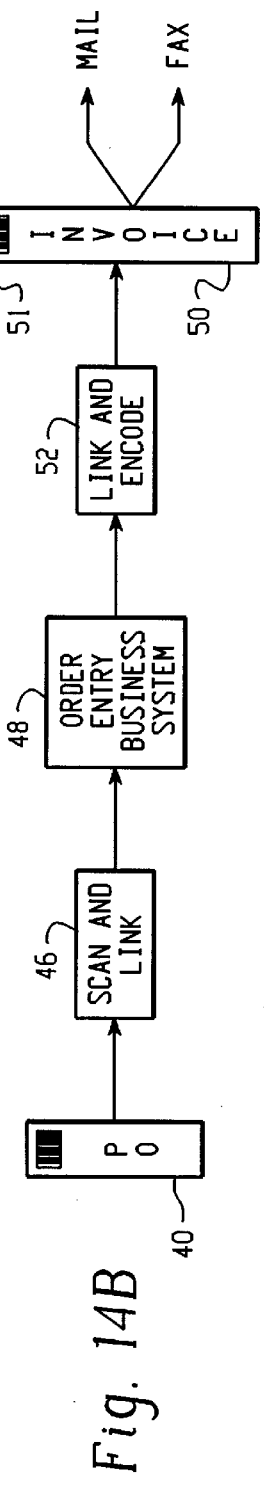

As represented in simplified form in FIG. 14B, upon receiving the PO, company XYZ scans the 2-D bar code to recover and store the encoded data at 46. Utilizing the data file decoded from the 2-D bar code, the different order entry business system 48 of company XYZ is enabled to map the data elements into program 48 for order preparation and shipment, and generation of an appropriate invoice 50. In order to accomplish such linking, at 46 use is made of a field definition file which enables matching of field identifiers to particular information categories. Thus, if numbers are used as field identifiers to identify each field of the data file, the field definition file might match field 1 to the information category "company name". This enables the PO data element comprising the company name to be appropriately mapped or linked from data field 1 of the data file into order entry business system 48. In the same manner, after the PO data is mapped in and processed by the order entry business system 48, invoice data elements are linked or assembled into a new data file which is encoded into 2-D image code 51 printed on outgoing invoice 50. It should be noted that the field definition file may also have been encoded into 2-D image code 41 or another 2-D image code for use at 46, or may have been earlier or otherwise provided for such use.

Figure 14C:
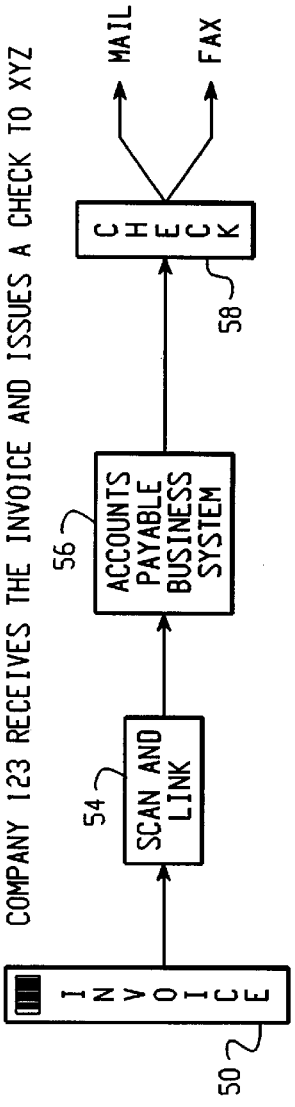

In FIG. 14C, when company 123 receives the goods or products shipped by company XYZ, the bar code on invoice 50 is scanned. Recovery at 54 of the decoded data elements from the data file of bar code 51, with mapping as enabled by use of the field definition file, permits reconciliation of the invoiced amount by use of accounts payable business system 56. The field definition file used at 54 may be the same as originally included in 2-D image code 41, for use at 46. Business system 56 is thereby enabled to implement issuance of a check 58 by company 123 to company XYZ for goods received.

It will now be noted that the entire transaction process of FIGS. 14A, B and C necessitated only a single initial manual data entry at the start of FIG. 14A PO generation. Thus, in this example, by use of the invention all manual re-entry of data has been avoided. It will be appreciated that in actual practice some additional data may be entered at different points in the transaction process, however, as illustrated re-entry of data is avoided, with avoidance of exposure to error and additional labor costs and time delay.

As will be further described, the invention thus allows individual users to transfer data without sacrificing one user's preferred business system software program as a requirement for compatibility with a second user's different business system. No reference is made to the basic operating environment, which may be DOS, MS Windows, Unix, or other. Transfer is enabled by use of a data file in accordance with the invention as the basic transfer media between two differing business systems, such as application programs for use with two different business forms.

Figure 15:
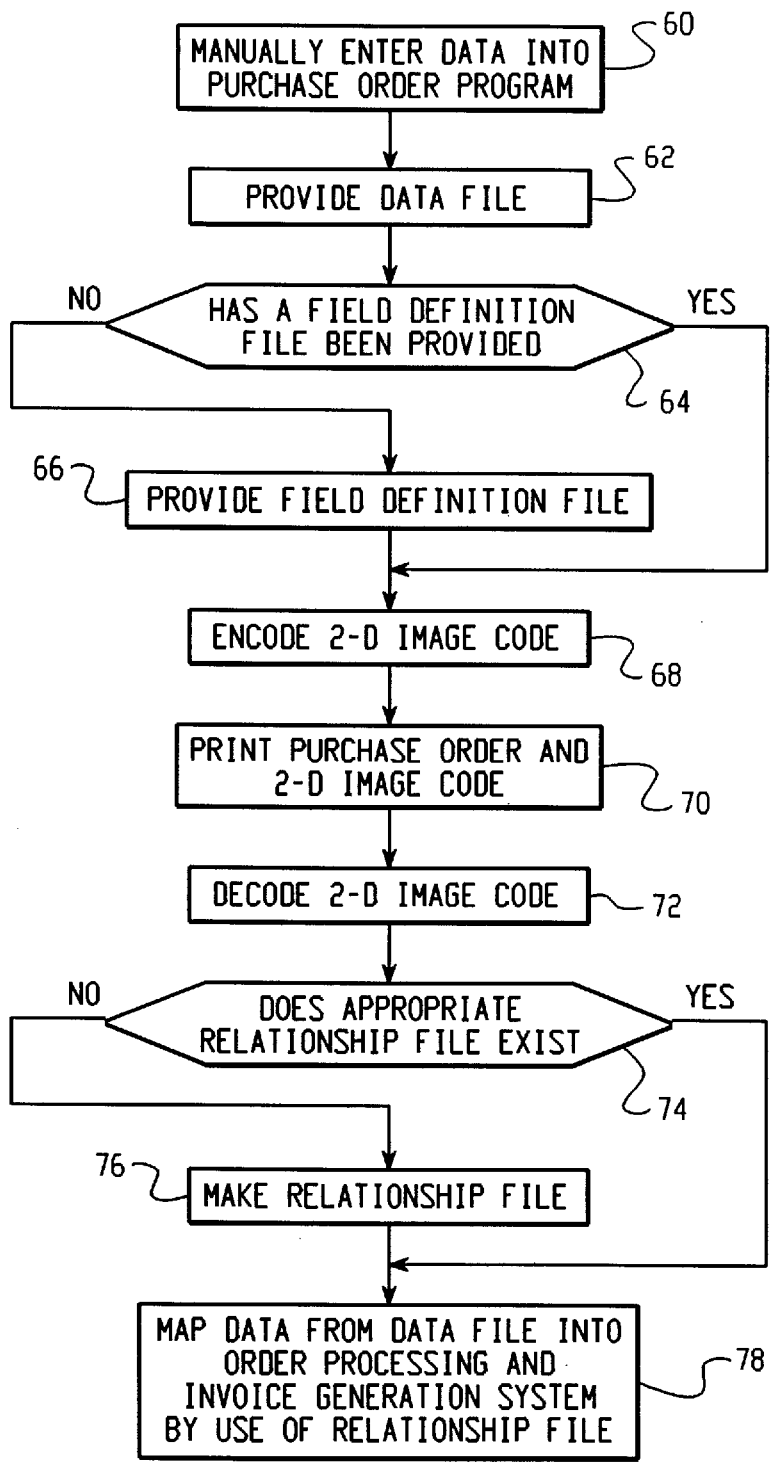
FIG. 15 is a flow chart useful in describing a data transfer method in accordance with the invention.

Referring now to FIG. 15, there is provided a flow chart illustrating one embodiment of a method of transferring, for use with a second business system, data elements which are initially entered by use of a first business system. For purposes of this example, the first business system may be an application program used by a purchaser to enable data to be entered for generation of a purchase order. The second business system may correspondingly be a different application program used by a seller of goods to both process incoming orders and generate related invoices. As discussed above, in prior usage the seller would have had to manually enter the data from the purchase order for use by the second business system with associated exposure to data entry error.

At step 60, data is manually entered to store data elements for a plurality of information categories, by use of a first business system (e.g., a purchase order generation program). Such data elements may typically include information in information categories such as the purchaser's name, address and phone number, as well as the identification, quantities, etc., of goods to be purchased in this example. A significant volume of data elements may be involved for a large order.

At step 62, a data file including data elements of the outgoing purchase order is provided. FIG. 16 shows a tabular representation of a simple example of a data file. The data file includes some or all of the data elements stored at step 60 with field identifiers which are effective to correlate individual data elements to particular data fields within the data file. This enables the presence and location in the data file of data elements of individual information categories to be identified. In this embodiment, the data file thus includes the purchase order data elements together with a field identifier (0, 1, 2, etc.) identifying the data field in which each data element appears. However, the data file does not include labels or other specific information usable to directly indicate what categories of information are available in particular data fields. Many forms of field identifiers may be used for this purpose, including use of identifying numbers or letters. Alternatively, field identifiers may not involve actual indicia such as numbers or letters, but may merely take the form of consistent use of predetermined data fields within the data file for data elements of particular information categories (e.g., company name always in the second data field, etc.).

Referring again to FIG. 15, at step 64 it is determined whether a field definition file (FDF) has been previously provided to the intended recipient of transferred data elements (e.g., the second business system). FIG. 17 shows a tabular representation of a FDF which identifies each data field in the data file, by correlating field identifiers (numbers 0 through 12 in this example) to individual information categories as shown. For example, field identifier "0" identifies a field including data elements representing the business system used to generate the data file, and field identifier "1" identifies a field including data elements representing the name of the company from which the data file was received. If a FDF has not previously been provided, the first business system provides a FDF at step 66. If a FDF has previously been provided and made available to the intended recipient of the data file, no FDF need be provided at this point. Alternatively, without provision of any FDF, subsequent identification can be enabled by including data elements for particular information categories only at predetermined field positions within the data file, as noted above. In such case, the actual field position in the data file is used as the field identifier, with no requirement for inclusion of separate field identifiers. Such usage may be facilitated by inclusion, in any data file fields intentionally left blank, of a non-substantive default data element in the form of a word or symbol preselected to identify a blank data field. Regardless of the means selected, the result is to provide a data file containing data elements in association with some form of field identifiers enabling the particular information category of an individual data element to be subsequently recognized or identified. In a variation, with provision of a FDF but with field positions used as field identifiers, consistent use can be employed to always tie particular field identifiers of a selected FDF to predetermined data fields (e.g., field identifier "1" of the FDF is always represented by the second data field).

At step 68, the data file is encoded into a 2-D image code. The FDF may also be encoded into the same image code or a separate 2-D image code (or may previously or otherwise be forwarded for use with the second business system.) At step 70, the purchase order and a representation of the 2-D image code (which may comprise one or more 2-D bar codes or other forms of two-dimensional machine readable image) are printed out on a piece of paper in this example. This provides both a human readable copy of the purchase order and a machine readable copy of the image code containing the data file. In other implementations it may be desirable to print out only the 2-D image code or to otherwise output the 2-D image code, as by electronically transmitting a representation of the 2-D image code without any hard copy print out. Thus, "outputting" is defined as printing out, electronically transmitting, or otherwise providing a representation of the 2-D image code.

At step 72, the 2-D image code is read and decoded to recover the data file (and FDF, if appropriate), which is typically stored in memory at this point. Choice of a suitable type of 2-D image code and encoding and decoding thereof can be implemented appropriately by persons skilled in the use and applications of such machine readable image codes, using systems such as described with reference to FIG. 1 or other suitable arrangements.

At step 74, the second business system determines whether an appropriate relationship file already exists for mapping data elements from the received data file into the order processing and invoice generating system. FIG. 18 shows a tabular representation of a relationship file (REL file). A particular REL file is used to map data from a particular data file (or more generally from any data file formatted to a particular predetermined presentation of data fields) to a particular second business system, both of which may be identified in the appropriate REL file. The remainder of the REL file correlates field identifiers employed in the data file to corresponding data entry field locations of the second business system. The REL file may also include substantive default data elements, which may be entered into corresponding data entry fields of the second system, if actual data elements for such fields are not present in the data file as received. As shown in the third column of the FIG. 18 REL file, for a series of transactions between two companies, basic data elements such as company identification may simply be provided on a default basis. At step 76, if an appropriate REL file does not already exist, the recipient, via the second business system or otherwise, uses field data from the FDF to create a REL file. An appropriate REL file can thus be created using knowledge as to the field locations for entry of data elements of particular information categories into the second system, in combination with the content of the FDF as already described.

At step 80, the data elements from the data file are automatically linked into the second business system by use of the REL file to map data elements to correct data entry fields (e.g., entry fields of the order processing/invoicing application program). At this point data originally entered manually in use of the purchase order program has been automatically transferred for use by the order entry/invoicing program, without manual re-entry. With reference to FIGS. 14A and 14B, it will be seen that the sequence of FIGS. 14A and 14B has now been completed through order entry at 48 in FIG. 14B.

For generation of invoice 50, the process can now effectively re-cycle through the FIG. 15 flow chart, with step 62 representing provision of an invoice data file corresponding to the order entry data file originally provided at step 62. The step 62 invoice data file can then be encoded into a 2-D image code and the image code printed out by company XYZ to provide invoice 50 in FIG. 14B (corresponding to steps 68 and 70 of FIG. 15). Upon receipt of the invoice by company 123 in FIG. 14C, the invoice can be decoded and entered into a third business system (accounts payable) of company 123 (corresponding to steps 70, 72, 74, 76 and 78) to enable generation of check 58 for distribution by mail or electronic transfer. It will thus be appreciated that with an understanding of the invention *the steps of FIG. 15, applied in appropriate repetitive series, can be readily utilized to implement all portions of the complete business transaction of FIGS. 14A, B and C with initial manual entry of data and no re-entry of such data. As noted, some additional data may require manual entry at different points in the transaction, however, additional data such as unit costs, shipping costs, etc. may already be stored for automatic use in the invoicing program, for example.

In view of the foregoing description, it will be apparent that a "data file", including data elements arrayed in various field positions and associated field identifiers which may typically be a sequence of numbers or letters or merely consistently used field positions, is a species of the more general "translation table" disclosed in the copending parent application. In the above-identified parent application the described example of a translation table useable with specific reference to tax returns and business transaction forms, includes data elements with associated descriptors or labels which directly identify the nature or information category of the data elements. The present application is more particularly directed to methods using data files as described, with associated field definition files and relationship files, as appropriate. As initially noted, such methods can be effective to reduce the volume of data which must be transferred, for example by removing certain information from a translation table and placing it into a field definition file which may need to be communicated only once for an extended series of transactions between two parties.

It should be noted that in implementation of the invention for different applications it will be apparent to skilled persons that steps of methods in accordance with the invention may be implemented in different order than described in the preceding example. For example, in FIG. 15 a data file is provided at step 62 and a corresponding FDF is provided at step 66 (unless previously provided). Thus, a data file is provided and, if necessary, a FDF is prepared based on the particular presentation of data fields in the data file. Alternatively, a FDF could be provided, after step 60 and before step 62, identifying particular data fields in which data elements for specific information categories are to be positioned in the data file. Then, at step 62, this FDF is used to assemble the data entered at step 60 into the data file provided at step 62.

In an alternative embodiment, the two parties to a business transaction may choose to have the first business system perform the mapping so that the data file is formatted to a predetermined presentation of data fields suitable for use by the second business system without input mapping. In this embodiment, the second system would generate the FDF correlating data files and fields to informational content. The first business system would use the FDF to assemble an outgoing REL file which includes information for mapping data elements from fields in the first business system to the data file fields as defined by the second business system in the FDF. With an understanding of the invention, other variations in use of the invention will be apparent to skilled persons.

With an understanding of methods in accordance with the invention as described above, the invention can be implemented utilizing the system and units of equipment as described with reference to FIG. 1 or other arrangements provided by skilled persons. More particularly, microprocessors or other computer configurations can be arranged to support data files, field definition files and relationship files as described in the following section, which includes specific rules suitable for governing formats of such files in particular implementations of the invention.

Data File

Rules governing the Data File format are as follows:

Each field is followed by a semicolon, including the last field.

Fields may be placed on the same line or separate lines. However, in order to minimize the overall size of the 2-D image code, it is recommended that fields are placed consecutively. For example:
Field_1;Field_2;Field_3; . . . ;Field_n;

Field_0 is the Data File field identifier which identifies the source business system.

Field_1 and on comprise the Data File field number and the respective data string. For example:
1;data_1;2;data_2; . . . ;n;data_n;

Field Definition File

Rules governing the format of the Field Definition File (FDF) are as follows:

Each field must be enclosed by <>, for example:
<field_#>.

Fields may be placed on the same line or separate lines, for example:
<field_1><field_2><field_3>
<field_4>
<field_5><field_6>
<field_7>
<field_8>

Each field comprises a Field Identifier, Field Label and Field Size separated by semicolons, for example:
<Field Identifier;Field Label;Field Data>.

1. The Field Identifier corresponds to the Data File field with the same identifier. The Field Identifier is the set of natural numbers: 1,2,3, . . .

2. The Field Label assigns a meaning to the data elements in the corresponding field. The data type is a string of up to 25 characters: Company ID, Address, . . .

3. The Field Data defines String Type and String Length, in bytes, allowed in a particular field. The String Type defines whether the data is purely numeric or alphanumeric. For numeric data the String Type is the pound sign (#), while for alphanumeric it is the dollar sign ($). The String Length indicates the maximum number of characters allowed in that field. The data type is the set of natural numbers: 1,2,3, . . . If the incoming data characters exceed the String Length, the characters beyond the threshold will be chopped off. To specify unlimited String Length, for either numeric or alphanumeric, simply omit the String Length parameter.

Example of a 20-character alphanumeric field:
<1;Company Name;$20>

Example of an unlimited alphanumeric field:
<3;Address;$>

Example of a 15-character numeric field: <5;Phone Number;#15>

Example of an unlimited numeric field: <10;Total;#>

Relationship File

Rules governing the format of the Relationship (REL) file are as follows:

Each field must be enclosed by <>, for example:
<field_#>.

Fields may be placed on the same line or separate lines, for example:
<field_1><field_2><field_3>
<field_4>
<field_5><field_6>
<field_7>
<field_8>

Each field comprises the Data File Field Identifier number and the application field index, separated by a semicolon. For example: <datafilefield#;appfield#>.

Note: datafilefield# is strictly an integer data type. On the other hand, appfield# can be either an integer value or a string name, which varies with application.

Example of an REL file between the Data File and Excel software; in a static case;
<1 ;R1C1<>2;R3C1<>3;R3C2>
<8;R3C3>

Example of an REL file between the Data File and Orders spreadsheet in Excel software, in a dynamic case (DDE):
<1;EXCEL|ORDERS|R1C1><2;EXCEL|ORDERS|R3C1>
<3;EXCEL|ORDERS|R3C2><8;EXCEL|ORDERS|R3C3>

With an understanding of the foregoing, skilled persons will be enabled to implement data files and other files as needed, in the above-described or other appropriate formats as may be suitable for particular applications of the invention.

While there have been described the currently preferred embodiments of the invention, those skilled in the art will recognize that other and further modifications may be made without departing from the invention and it is intended to claim all modifications and variations as fall within the scope of the invention.

What is claimed is:

1. A method of transferring for use with a second business system, data elements entered by use of a first business system, comprising the steps of:

(a) storing data elements for a plurality of information categories, by use of said first business system;

(b) providing a data file including said data elements with field identifiers correlating said data elements to data fields of said data file, said field identifiers usable to link data elements of individual information categories from said data file for processing by said second business system;

(c) encoding said data file into a 2-D image code; and (d) outputting a business document, including a representation of said 2-D image code, in one of a printed format and an electronic format.

2. A method as in claim 1, additionally comprising the following steps:

(e) decoding said 2-D image code to recover said data file; and (f) utilizing said field identifiers to identify information categories of data elements to link data elements to data fields of said second business system for processing of data elements of said business document by said second business system without manual re-entry of data elements.

3. A method as in claim 1, wherein said first business system is a purchase order generating program and step (d) comprises outputting a purchase order in human readable form with said 2-D image code printed on said purchase order, and said second business system is a different business system including at least one of an order processing program and an invoice generating program.

4. A method of transferring for use with a second business system, data elements entered by use of a first business system, comprising the steps of:
   (a) storing data elements for a plurality of information categories, by use of said first business system;
   (b) providing a data file including said data elements with field identifiers correlating said data elements to data fields of said data file, said field identifiers usable to link data elements of individual information categories from said data file for processing by said second business system;
   (c) encoding said data file into a 2-D image code; and
   (d) outputting a representation of said 2-D image code.

5. A method as in claim 4, additionally comprising the following steps:
   (e) decoding said 2-D image code to recover said data file; and
   (f) utilizing said field identifiers to identify information categories of data elements to link data elements to data fields of said second business system for processing.

6. A method as in claim 4, wherein step (d) comprises outputting said 2-D image code in one of a printed format and an electronic format.

7. A method as in claim 4, wherein step (d) comprises outputting in a printed format both said data elements, in human readable form, and said representation of said 2-D image code.

8. A method as in claim 4, wherein said first business system is a first application program and said second business system is a different application program.

9. A method as in claim 4, wherein said first business system is a purchase order generating program and step (d) comprises outputting a purchase order in human readable form with said 2-D image code printed on said purchase order, and said second business system is a different business system including at least one of an order processing program and an invoice generating program.

10. A method of transferring for use with a second business system, data elements entered by use of a first business system, comprising the steps of:
    (a) storing data elements for a plurality of information categories of a business transaction, by use of said first business system;
    (b) providing a data file including said data elements in a plurality of data fields, each identified by a field identifier;
    (c) providing a field definition file correlating said field identifiers to individual information categories of said plurality of information categories;
    (d) encoding said data file into a 2-D image code;
    (e) outputting a representation of said 2-D image code;
    (f) decoding said 2-D image code to recover said data file; and
    (g) utilizing said field definition file to identify information categories of data elements included in data fields of said data file, to enable said data elements to be processed by use of said second business system.

11. A method as in claim 10, wherein step (e) comprises outputting said 2-D image code in one of a printed format and an electronic format.

12. A method as in claim 10, wherein step (e) comprises outputting both said data elements in human readable form and said representation of said 2-D image code, in a printed format.

13. A method as in claim 10, wherein step (d) includes also encoding said field definition file into said 2-D image code.

14. A method as in claim 10, wherein said first business system is a first application program and said second business system is a different application program.

15. A method as in claim 10, wherein said first business system is a purchase order generating program and step (e) comprises outputting a purchase order in human readable form with said 2-D image code printed on said purchase order, and said second business system is a different program including at least one of an order processing program and an invoice generating program.

16. A method as in claim 10, wherein step (g) includes using said field definition file to provide a relationship file usable to map data elements of said data file to input data fields of said second business system.

17. A method of transferring for use with a second business system, data elements entered by use of a first business system, comprising the steps of:
    (a) storing data elements for a plurality of information categories, by use of said first business system;
    (b) providing a data file with each said data element included in a data field corresponding to the information category of said data element;
    (c) encoding said data file into a 2-D image code;
    (d) outputting a representation of said 2-D image code;
    (e) decoding said 2-D image code to recover said data file; and
    (f) utilizing a relationship file correlating data fields of said data file to information entry categories of said second business system, to link data elements from said data file for processing by said second business system.

18. A method as in claim 17, wherein step (b) includes using a field definition file, which correlates field identifiers to individual information categories, in providing said data file.

19. A method as in claim 18, wherein step (c) includes also encoding said field definition file into said 2-D image code.

20. A method as in claim 19, wherein step (f) includes utilizing said field definition file to identify information categories of data elements included in said data file.

21. A method as in claim 17, wherein step (d) comprises outputting said 2-D image code in one of a printed format and an electronic format.

22. A method as in claim 17, wherein step (d) comprises outputting in a printed format both said data elements, in human readable form, and said representation of said 2-D image code.

23. A method as in claim 17, wherein said first business system is a first application program and said second business system is a different application program.

24. A method as in claim 17, wherein said first business system is a purchase order generating program and step (d) comprises outputting a purchase order in human readable form with said 2-D image code printed on said purchase order, and said second business system is a different program including at least one of an order processing program and an invoice generating program.

* * * * *